(12) United States Patent
Hull et al.

(10) Patent No.: US 7,577,901 B1
(45) Date of Patent: Aug. 18, 2009

(54) MULTIMEDIA DOCUMENT ANNOTATION

(75) Inventors: Jonathan J. Hull, San Carlos, CA (US); Michael Baxter, Sunnyvale, CA (US)

(73) Assignee: Ricoh Co., Ltd., Tokyo (JP)

( * ) Notice: Subject to any disclaimer, the term of this patent is extended or adjusted under 35 U.S.C. 154(b) by 0 days.

(21) Appl. No.: 09/526,031

(22) Filed: Mar. 15, 2000

(51) Int. Cl.
*G06F 17/00* (2006.01)

(52) U.S. Cl. ............ 715/230; 715/209; 707/3; 707/6; 358/1.15

(58) Field of Classification Search ........... 715/512, 715/741; 345/619, 629; 386/55; 358/474
See application file for complete search history.

(56) References Cited

U.S. PATENT DOCUMENTS

| | | | | |
|---|---|---|---|---|
| 4,831,610 A | * | 5/1989 | Hoda et al. | 369/47.23 |
| 5,337,362 A | * | 8/1994 | Gormish et al. | 380/54 |
| 5,420,974 A | * | 5/1995 | Morris et al. | 715/515 |

(Continued)

FOREIGN PATENT DOCUMENTS

| | | |
|---|---|---|
| JP | 6231466 | 8/1994 |
| JP | 9204389 | 5/1997 |

OTHER PUBLICATIONS

Robinson et al., "The Origami Project: Paper Interfaces to the World-Wide Web", [http://www.cl.cam.ac.uk/Research/Origami/Origami1997f/index.html], submitted to Webnet 97 in Nov. 1997, pp. 1-6.*

(Continued)

*Primary Examiner*—Doug Hutton
*Assistant Examiner*—Quoc A Tran
(74) *Attorney, Agent, or Firm*—Blakely, Sokoloff, Taylor & Zafman LLP

(57) ABSTRACT

A method and apparatus for adding multimedia annotations to paper documents is disclosed. In one embodiment, a user generates a multimedia annotation to be combined to a paper document. The multimedia annotation is combined with the paper document to form a multimedia document. In another embodiment, an image of the paper document is generated. The multimedia annotation is combined to the image of the paper document to form an electronic multimedia document. The multimedia annotation is attached to the paper document in the form of plain text URL or bar code representing the URL. The electronic multimedia document is stored for later retrieval.

31 Claims, 7 Drawing Sheets

U.S. PATENT DOCUMENTS

| | | | |
|---|---|---|---|
| 5,444,779 A | | 8/1995 | Daniele |
| 5,495,581 A | | 2/1996 | Tsai |
| 5,524,193 A | | 6/1996 | Covington et al. |
| 5,640,193 A | * | 6/1997 | Wellner ...................... 725/100 |
| 5,804,803 A | * | 9/1998 | Cragun et al. ................ 235/375 |
| 5,838,313 A | | 11/1998 | Hou et al. |
| 5,838,458 A | | 11/1998 | Tsai |
| 5,880,740 A | * | 3/1999 | Halliday et al. ............. 345/629 |
| 5,893,126 A | | 4/1999 | Drews et al. |
| 5,905,248 A | * | 5/1999 | Russell et al. .......... 235/462.15 |
| 6,076,734 A | * | 6/2000 | Dougherty et al. ..... 235/462.01 |
| 6,208,436 B1 | * | 3/2001 | Cunningham ............... 358/474 |
| 6,256,638 B1 | * | 7/2001 | Dougherty et al. ....... 707/104.1 |
| 6,448,979 B1 | * | 9/2002 | Schena et al. ............... 715/741 |
| 6,572,661 B1 | * | 6/2003 | Stern ........................ 715/501.1 |
| 6,674,923 B1 | * | 1/2004 | Shih et al. ................... 382/305 |

OTHER PUBLICATIONS

Lange et al., "Insight Lab: An Immersive Team Environment Linking Paper, Displays, and Data", Computer-Human Interactions, Apr. 1998, pp. 550-557.*

Newman et al., "A Desk Supporting Computer-based Interaction with Paper Documents", Computer-Human Interactions, May 1992, pp. 587-592.*

Robinson et al. "The Origami Project: Paper Interfaces to the World-Wide Web", [http://www.cl.cam.ac.uk/Research/Origami/Origami1997f/index.html], submitted to Webnet 97 in Nov. 1997 pp. 1-6.*

* cited by examiner

405 — From: hart@rsv.ricoh.com
To: hull@rsv.ricoh.com
Subject: Document with multimedia content Jonathan:

I am sending you this document:
410 — http://www.rsv.ricoh.com/mmdoc_421.html

FIG. 4A

Document copied on MFP in front of CRC Fri Aug 15 14:43:00 1999
This document's IM address: http://www.rsv.ricoh.com/mmdoc_421.html

412 —

| Data | Handling | Searching | Communications |
|---|---|---|---|
| OCR results | Print | Full text search | Email |
| 415 — Multimedia Annotation | | | Publish on the WWW |

FIG. 4B

MULTIMEDIA DOCUMENT ANNOTATION

FIELD OF THE INVENTION

The present invention relates generally to field of multimedia creation and presentation. More specifically, the present invention is directed to adding multimedia annotations to paper or electronic documents.

BACKGROUND

Multimedia is a term used to describe the ability to combine different kinds of information storage and/or communication media, such as sounds, video, text, music, animations, charts, maps, etc., into colorful, interactive presentations, business applications, games, etc. Examples of information storage media include books, phonograph records, audio and videotapes, microfilm, and magnetic and optical disks.

Audio and video clips require enormous amounts of storage space, and for this reason, until recently, programs could not use any but the most rudimentary animations and sounds. The enormous storage capacity of current storage devices such as the compact disc read only memory (CD-ROM) changes all that. When using simultaneous clips from several different media, the user's senses of sight, sound, and touch are merged into an astonishingly real experience.

Faster computers and rapid proliferation of multimedia programs will probably forever change the way people get information. The computer's ability to instantly retrieve a tiny piece of information from the midst of a huge mass of data has always been one of its most important uses. Since video and audio clips can be stored alongside text on a single CD-ROM disc, a whole new way of exploring a subject is possible. By using hyperlinks, materials can be presented to people so that they can peruse it in a typically human manner, by association.

Although there are technologies today that allow for the implementation of multimedia, current implementations do not address the incorporation of multimedia with the traditional form of office communication, the paper document. Since most communications within an office today are still made with the traditional paper documents such as memos and notes, it would be advantageous to be able to add multimedia to the paper documents and enable the office user to convey the sound and emotion with the paper document.

SUMMARY OF THE INVENTION

A method and apparatus for adding multimedia annotations to paper documents is disclosed. In one embodiment, a multimedia annotation is created for a paper document. The multimedia annotation is combined with the paper document to form a multimedia document.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIG. 4 illustrates an exemplary email message and a Uniform Resource Locator (URL) that provides a link to the multimedia content.

DETAILED DESCRIPTION

Figure 1:
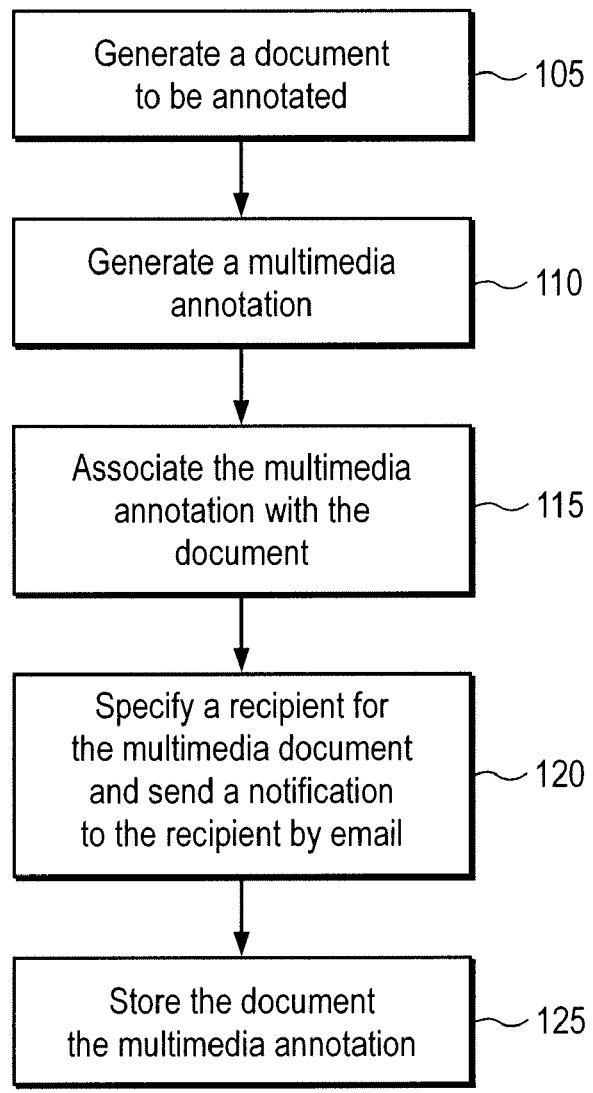
FIG. 1 illustrates a flow diagram of one embodiment of a process of annotating.

A method and apparatus for adding multimedia annotations to paper documents is disclosed. In the following description, for purposes of explanation, specific nomenclature is set forth to provide a thorough understanding of the present invention. However, it will be apparent to one skilled in the art that these specific details are not required in order to practice the present invention. For example, the sending of the multimedia document by email is described with reference to an Internet. However, the same techniques can easily be applied to other types of network.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Overview

In one embodiment, a method and apparatus for creating and adding multimedia annotation to paper or electronic documents to create a multimedia document is described.

FIG. 1 is a flow diagram of one embodiment of a process for adding multimedia contents to a document. Referring to FIG. 1, at block 105, the user creates a document. In one embodiment, the document is a paper document (e.g., hand written document, a document created through the use of a typewriter, a printed copy, etc.). The user then generates a multimedia annotation to accompany the document, as shown in block 110. In one embodiment, the multimedia annotation can be an audio sound, a video clip, a combination of both the audio sound and the video clip, etc. The multimedia annotation can be generated at the same time the document is created or at a different time. At block 115, the annotation is associated with the document to create a multimedia document. In one embodiment, the annotation is placed on an area of the document. The annotation may be in different forms, such as, for example, a bar code containing an audio message or a URL indicating a link to a video clip.

In one embodiment, the user specifies a recipient to receive the multimedia document. The recipient may be specified by the user entering the recipient's address such as, for example, an Internet email address. The email message is generated and sent to the recipient, as shown at block 120. Alternatively, the user may choose to specify a recipient for the document at another time. At block 125, the document and the annotation are saved in a storage area. The document and the annotation can be saved together or they can be saved in separate storage areas.

Figure 2:
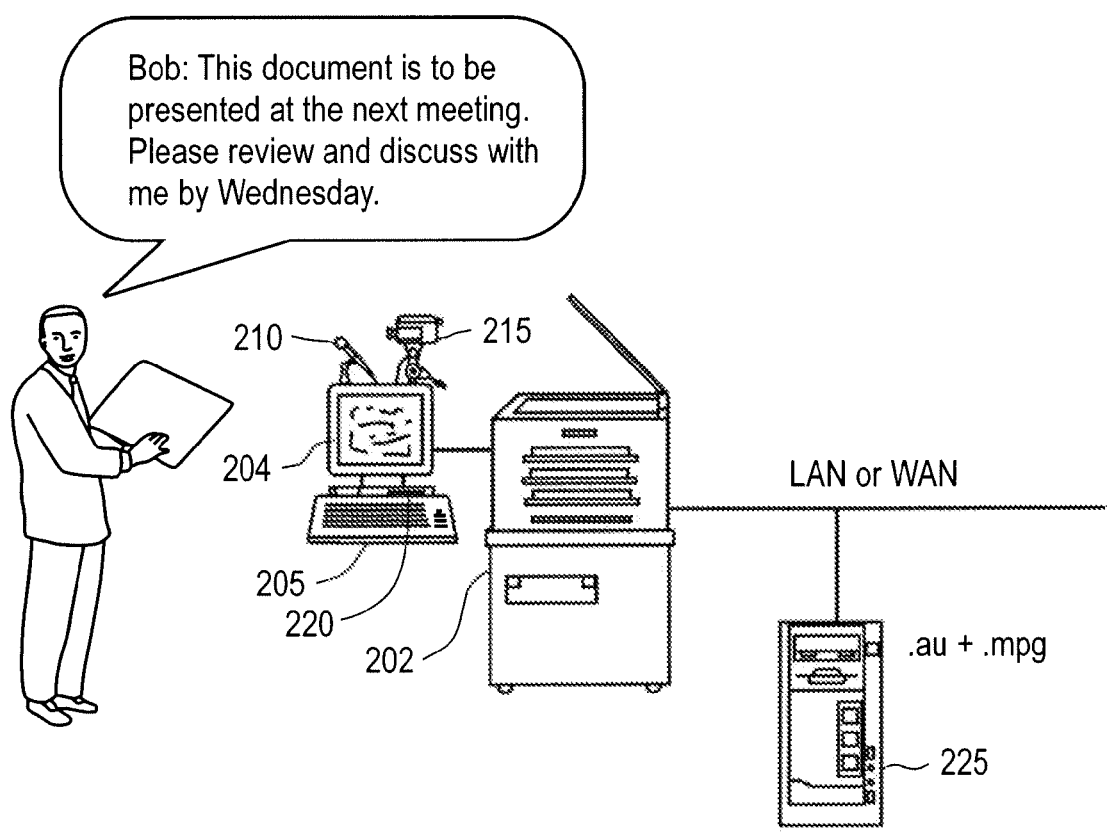
FIG. 2 depicts one embodiment of a multi-function system for annotating documents with the multimedia information.

FIG. 2 shows one embodiment of a multi-function system. In one embodiment, the multi-function system 202 can be a photocopier equipped with a display console 204 and a keypad 205. The multi-function system 202 may include a microphone 210, a video camera 215, and a disk drive 220 to accept input generated from a different system. Furthermore, in one embodiment, the multi-function system 202 includes hardware for digitizing the audio and/or video multimedia inputs. The formats of the audio sound and the video clip may include, for example, MP3 audio (MPEG audio layer 3) and MPEG video (a digital video compression standards from the Motion Picture Experts Group).

In one embodiment, the user generates the multimedia annotation while using the multi-function system 202 to copy a paper document. While copying the paper document, the multi-function system 202 captures an image of the paper document and saves it on the server machine 225 automatically. In another embodiment, the user may generate the document in electronic form and then used the electronic form of the document with the multi-function system 202.

The server machine 225 is coupled to the multi-function system 202 through a network such as, for example, a local area network. The server machine 225 is used to store the multimedia documents so that it can be retrieved by the user or by the person to whom the user sends the multimedia document. In one embodiment, the console 204 is used to specify the recipient(s) of the multimedia document. The automatic saving feature of the system allows users to save document images while requiring no decision on the part of the user.

In one embodiment, the microphone 210 is automatically activated when the user selects a copy function on the multi-function system 202. The user generates the multimedia annotation by speaking to the microphone 210 on the multi-function system 202.

In another embodiment, the user may prepare the multimedia annotation prior to using the multi-function system 202. For example, the user generates the multimedia annotation on a workstation, records it on a portable storage device such as, for example, a floppy disk, and physically carries the portable storage device to the multi-function system 202. Upon inserting the portable storage device in the drive 220 on the copier, the user is presented with an interface on the console 204. In one embodiment, the interface lists all the available multimedia annotations stored on the portable storage device and allows the user to review and select them. The user may interact with the interface through a user controllable device coupled to the multi-function system 202, such as, for example, a mouse. Additionally, a keyboard 225 may be provided to allow the user to perform any editing functions, such as, for example, specifying or changing the names of the recipients for the documents. The interface of the multi-function system 202 may provide a mechanism for the user to associate a selected multimedia annotation with the document. For example, a drag-and-drop function to indicate which multimedia annotation should be applied to the document being copied.

In one embodiment, the user may use the keyboard 225 in conjunction with the console 204 to indicate information about the recipient of the document, such as, for example, names, email address, phone number, fax number, etc.

The server machine 225 may be configured to allow access only after authentication. For example, only the recipient who possesses a valid user identification and/or password may access the corresponding multimedia documents stored on the server machine 225. In one embodiment, to provide additional security, the multimedia document may also be encrypted. For example, the multi-function system 202 may utilize a digital key belonging to the recipient to encrypt the document. In this manner, only those individuals having the recipient digital key may decrypt the code and recover the original document.

In one embodiment, the multimedia document generated by the multi-function system 202 can be a physical document such as, for example, a paper, a transparency, etc. This may be in addition to the document image that was automatically stored. For example, a paper document generated by the copier function of the multi-function system 202 may contain a plain text representation for a Uniform Resource Locator (URL) that indicates the network address where the multimedia annotation is stored. An individual may distribute this paper version of the multimedia document to the recipients.

Additionally, an individual may decide to notify the recipients by email that provides them with the URL for the multimedia document. In another embodiment, the URL where the multimedia document is stored can be represented by a bar code generated by the multi-function system 202 and printed on the document.

Figure 3:
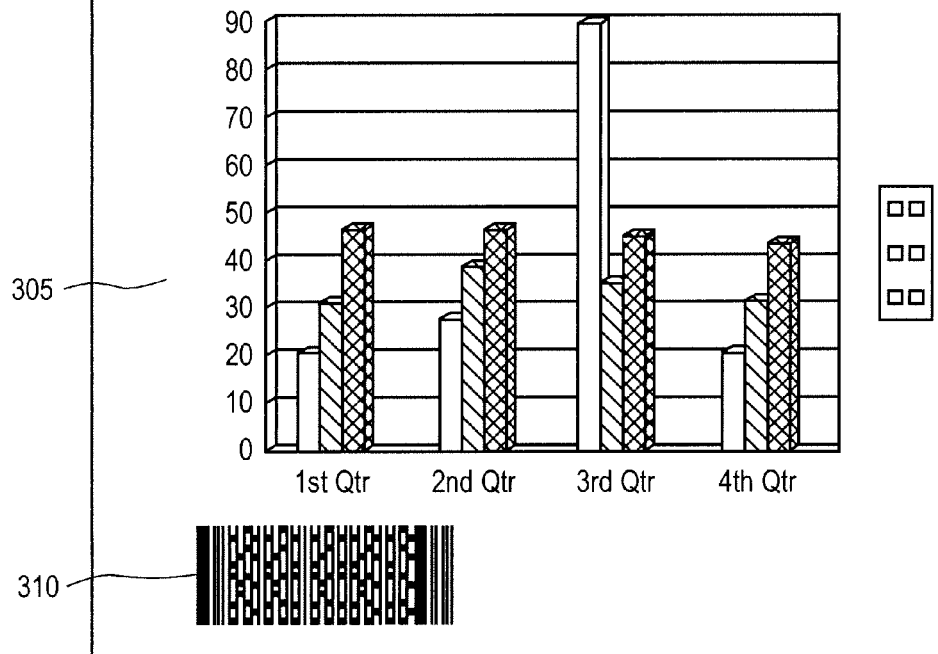
FIG. 3 illustrates an exemplary document with a multimedia annotation represented with a bar code.

FIG. 3 illustrates an exemplary embodiment of a document with the multimedia annotation represented as a bar code. In this case, the document 305 can be a paper document and the complete multimedia annotation can be represented with bar code 310 printed on the face of the document. The multimedia annotation can be retrieved by decoding the bar code 310. In alternative embodiments, the multimedia annotation may be emailed using digital links as described in U.S. Pat. No. 5,337,362 issued to Gormish et al. on Aug. 9, 1994.

FIG. 4A illustrates an exemplary embodiment of an email message containing a URL that represents the link to the multimedia document. The recipients of multimedia documents can be notified by the email message 405 that includes a URL 410 for the multimedia document. The email message may be generated by the user at the time the multi-function system is activated (e.g., selecting the copy function). The recipients then can access the multimedia document (document and multimedia annotation) by selecting the URL 410.

FIG. 4B illustrates an exemplary embodiment of a multimedia document. In one embodiment, upon selecting the URL, the image of the multimedia document 412 is presented to the recipient and, at the same time, a multimedia player is invoked and run at the recipient's workstation. The multimedia player plays the multimedia annotation that is part of the document. Alternatively, the multimedia player is invoked when the user selects the multimedia annotation indicator 415.

The multimedia player can be, for example, the RealPlayer from RealNetworks which supports RealAudio for sound and RealVideo for video. A multimedia annotation can also be generated in other formats for audio and video and still be supported by the multimedia player provided the appropriate plug-ins for these formats are installed. With streaming audio and streaming video from RealNetworks, the recipients can listen to the audio sound or view the video clip while the multimedia annotation is being transferred from its location.

In another embodiment, the recipient may also receive an email message that contains the complete multimedia annotation encoded as a Multi-purpose Internet Mail Extensions (MIME) attachment. The MIME attachment is then downloaded into the recipient's system and the multimedia document can then be viewed.

In one embodiment, the multi-function system can contact the recipients by telephone when a multimedia document is sent to the recipient. The multi-function system may employ digitized voice and notify the recipients that they have documents waiting for them in a multimedia message queue on the server machine. The recipients can inspect the queue and retrieve the appropriate multimedia documents. Alternatively, the recipient may receive no notification. In this case, the system may place the multimedia document in the recipient's message queue for later inspection. The recipients may retrieve the documents in several ways. The users may periodically inspect their message queue on the server machine and download their most recent messages, much the same way voice mail systems operate.

In one embodiment, the server machine includes a retrieval engine that allows the users to search for archived multimedia documents based on their contents. In this case, the multimedia documents were created from an image of the paper documents. The multimedia documents may be subjected to an optical character recognition (OCR) process to help with the content-based search. In another embodiment, when the multimedia annotation is an audio clip, representative audio tracks are generated for each user on the system using speech recognition software such as, for example, ViaVoice from IBM of Armonk, N.Y. The multimedia documents can be searched based on the user's voice as recorded in the audio message. The user's voice can be recognized using a speaker or voice identification software such as, for example, WaveMakers from Waver Makers Research Inc. In another embodiment, when the multimedia annotation is a video clip, a video track containing an image of the user can be used as input to face recognition techniques. These various embodiments just described allow the recipients to search for the multimedia annotations by their textual content as well as by the identity of the user, either by the user's voice or by the user's image. In other embodiments, the multimedia documents can be searched using parameters such as, for example, the dates of recording, storage, and transmission of the message.

In another embodiment, the multi-function system of FIG. 2 can operate as a fax machine and captures an image of a fax document while sending the fax. In this case, the document printed on the receiver's fax machine can contain a printed plain text URL, a bar code representation for the URL, or a bar code that represents the entire contents of the message. Similarly, the multi-function system of FIG. 2 can operate as a scanner. As discussed above, the console of the multi-function system can be used to specify the recipients of the scanned document. Additionally, the console is used to as a means to notify the recipients as well as a means to access the server machine. Still in another embodiment, the multi-function system of FIG. 2 can operate as a printer accepting print request from the user's workstation. In this case, the workstation from which the document is printed is equipped with the necessary multimedia input devices to allow the user to generate multimedia annotations. When the document is to be printed from the user's workstation, the user added the multimedia annotation to the document. A plain text URL or a bar code that represents the URL or the complete multimedia annotation can be added by the user in the same manner previously described.

Figure 5:
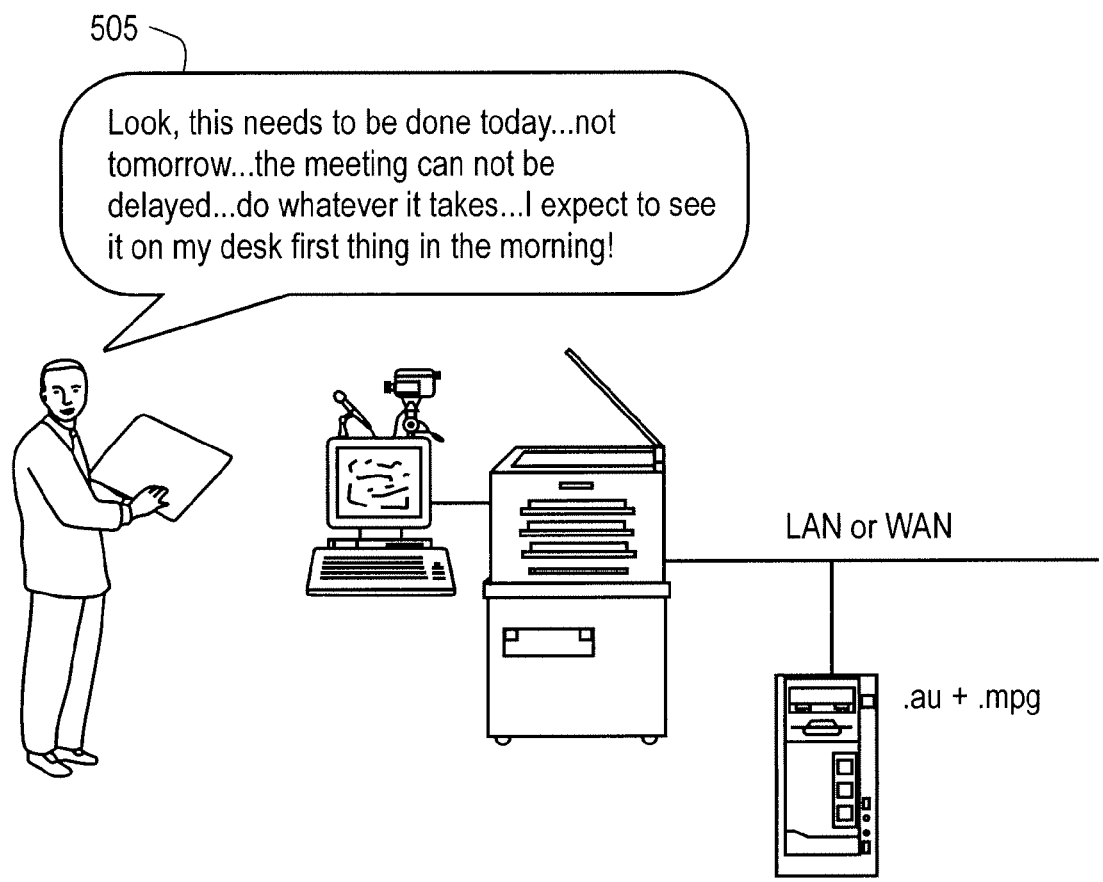
FIG. 5 illustrates an exemplary embodiment of a system that provides for adding multimedia annotation with emotional content to a document.

Using the method and apparatus described herein provide an individual a way for communicating emotions through a paper document. For example, FIG. 5 shows a user adding a highly emotional message 505 to a document. The audio sound makes the user's meaning abundantly clear to the recipient.

Figure 6:
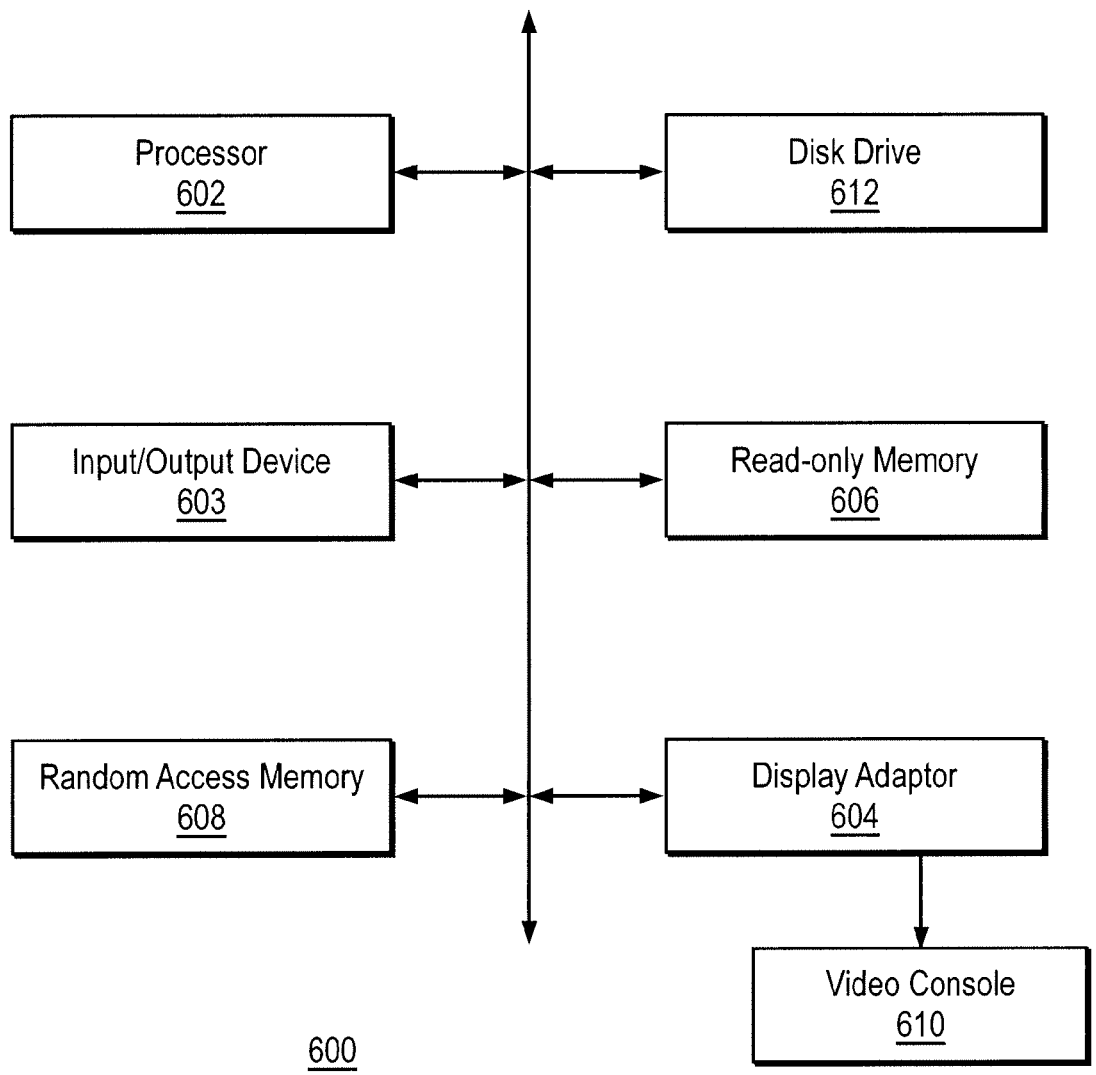
FIG. 6 illustrates one embodiment of a computer system.

FIG. 6 illustrates an embodiment of a computer system that can be used to perform operations described herein. The various components shown in FIG. 6 are provided by way of example. Certain components of the computer in FIG. 6 can be deleted from the addressing system for a particular implementation of the invention. The computer shown in FIG. 6 may be any type of computer including a general-purpose computer.

FIG. 6 illustrates a system bus 600 to which various components are coupled. A processor 602 performs the processing tasks required by the computer. Processor 602 may be any type of processing device capable of implementing the steps necessary to perform the operations discussed above. An input/output (I/O) device 603 is coupled to bus 600 and provides a mechanism for communicating with other devices coupled to the computer. For example, the user can use the I/O device 603 to specify the name and email address of the recipient to whom the multimedia document is to be sent. A graphics display adapter 604 is connected to the bus to receive display data generated by the processor 602 and store the display data in a display buffer. A read-only memory (ROM) 606 and a random access memory (RAM) 608 are coupled to bus 600 and provide a storage mechanism for various data and information used by the computer, such as, for example, the interface code that allow the user to interact with the computer. Although ROM 606 and RAM 608 are shown coupled to bus 600, in alternate embodiments, ROM 606 and RAM 608 are coupled directly to processor 602 or coupled to a dedicated memory bus (not shown).

A video console 610 is coupled to the graphics display adapter 604 and displays various information and data stored in the display buffer to the user of the computer. The data display may include the different multimedia annotations stored on the portable storage device. A disk drive 612 is coupled to bus 600 and provides a facility for the user to load multimedia annotations previously generated on the user's workstation.

Figure 7:
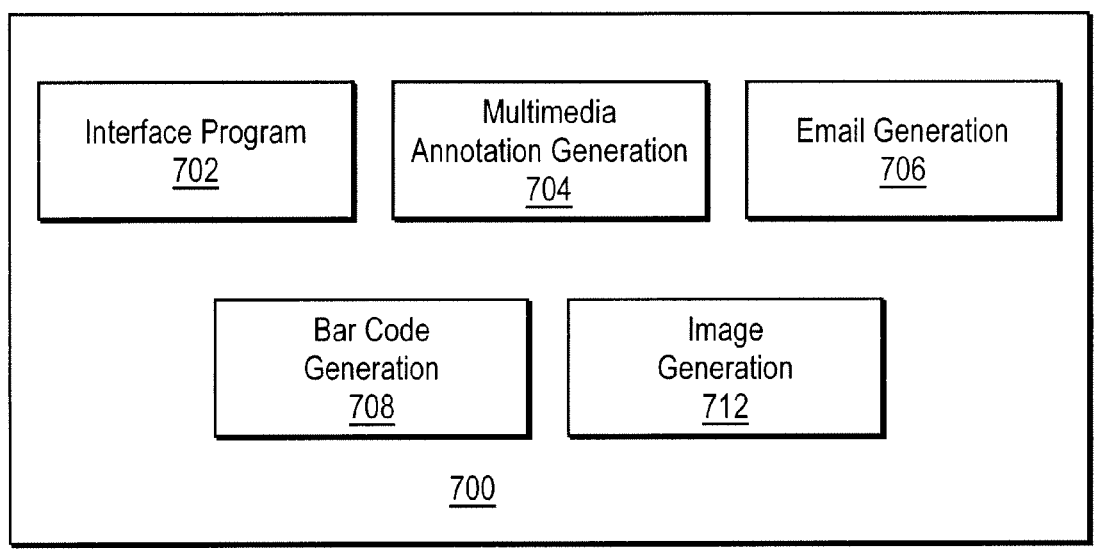
FIG. 7 illustrates one embodiment of a computer-readable medium containing various sets of instructions, code sequences, configuration information, and other data used by a computer or other processing device.

FIG. 7 illustrates an embodiment of a computer-readable medium 700 containing various sets of instructions, code sequences, configuration information, and other data used by a computer or other processing device. The embodiment illustrated in FIG. 7 is suitable for use with the multimedia annotation method described above. The various information stored on medium 700 is used to perform various data processing operations. Computer-readable medium 700 is also referred to as a processor-readable medium. Computer-readable medium 700 can be any type of magnetic, optical, or electrical storage medium including a diskette, magnetic tape, CD-ROM, memory device, or other storage medium.

Computer-readable medium 700 includes interface code 702 that controls the flow of information between various devices or components in the computer system. Interface code 702 may control the transfer of information within a device (e.g., between the processor and a memory device), or between an input/output port and a storage device. Additionally, interface code 702 may control the transfer of information from one device to another.

Computer-readable medium 700 also includes the multimedia annotation generation application 704 that is used to generate the audio and/or video messages. Other codes stored on the computer-readable medium 700 may include the email message generation code 706 to notify the recipient of the existence of the multimedia document, a bar code generation code 708 to generate a bar code representation of an audio message, and the image generation code 712 that generates an image of the paper document.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method comprising:
    reproducing a paper document via a document reproduction system;
    creating a multimedia annotation for the paper document during the reproduction, wherein the multimedia annotation is an audio sound that is input by a user via a microphone of the document reproduction system;
    creating a first multimedia document by combining the paper document and the multimedia annotation, wherein the first multimedia document includes a first bar code that encodes the audio sound therein;
    processing the first multimedia document;
    decoding the multimedia annotation from the first bar code;
    extracting the audio sound; and
    playing the audio sound via a multimedia player.

2. The method of claim 1, wherein a location indicator associated with the multimedia annotation is placed on the first multimedia document, wherein the location indicator indicates where the multimedia annotation can be retrieved and played.

3. The method of claim 2, wherein the location indicator comprises a first Uniform Resource Locator (URL) indicated in plain text, wherein the first multimedia document includes a second bar code, and wherein the second bar code represents the first URL in an encrypted form.

4. The method of claim 1, further comprising:
    generating an image of the paper document, wherein the image of the paper document is unconsciously captured via the document reproduction system during the reproduction of the paper document without user intervention;
    creating a second multimedia document by combining the image of the paper document and the multimedia annotation; and
    storing the second multimedia document in a storage that stores a plurality of multimedia documents, wherein the second multimedia document is an electronic document associated with the first multimedia document which is a physical document.

5. The method of claim 4, wherein the second multimedia document is represented as a second Uniform Resource Locator (URL) printed on the first multimedia document, and wherein the image of the paper document and the multimedia annotation is accessed with the second URL.

6. The method of claim 5, wherein the first multimedia document includes a third bar code that represents the second URL.

7. The method of claim 4, further comprising:
    automatically emailing the second multimedia document to a recipient during the reproduction of the paper document, wherein the recipient is specified by a user via an interface of the document reproduction system when the user reproduces the paper document using the document reproduction system.

8. The method of claim 7, wherein the recipient receives the second multimedia document in the form of Multi-purpose Internet Mail Extension (MIME).

9. The method of claim 4, further comprising:
    capturing a video clip of the multimedia annotation from the user via a video camera of the document reproduction system when the user reproduces the paper document using the document reproduction system.

10. The method of claim 9, wherein the video camera is automatically activated when the user selects a reproduction function of the document reproduction system to reproduce the paper document.

11. The method of claim 4, further comprising:

in response to a request to retrieve a multimedia document from among the plurality of multimedia documents stored in the storage, performing a content-based search on multimedia annotations of the plurality of multimedia documents for the requested multimedia document within the storage based on content of the multimedia annotation associated with the requested multimedia document.

12. The method of claim 11, wherein the content-based search is performed via an optical character recognition (OCR) process on the multimedia annotation of the multimedia documents being searched.

13. The method of claim 11, wherein the content-based search is performed via a speech recognition mechanism on an audio sound of the multimedia annotation of the multimedia documents being searched.

14. The method of claim 11, wherein the content-based search is performed on a video clip of the multimedia annotation based on an image of the user using face recognition techniques.

15. The method of claim 1, wherein the microphone is automatically activated when the user selects a reproduction function of the document reproduction system to reproduce the paper document.

16. A machine-readable medium providing instructions which, when executed by a set of one or more processors, cause said set of one or more processors to perform the following:

reproducing a paper document via a document reproduction system;

creating a multimedia annotation for the paper document during the reproduction, wherein the multimedia annotation is an audio sound that is input by a user via a microphone of the document reproduction system;

creating a first multimedia document by combining the paper document and the multimedia annotation, wherein the first multimedia document includes a first bar code that encodes the audio sound therein;

processing the first multimedia document;

decoding the multimedia annotation from the first bar code;

extracting the audio sound; and playing the audio sound via a multimedia player.

17. The machine-readable medium of claim 16, wherein a location indicator associated with the multimedia annotation is placed on the first multimedia document, wherein the location indicator indicates where the multimedia annotation can be retrieved and played.

18. The machine-readable medium of claim 17, wherein the location indicator comprises a first Uniform Resource Locator (URL) indicated in plain text, wherein the first multimedia document includes a second bar code, and wherein the second bar code represents the first URL in an encrypted form.

19. The machine-readable medium of claim 16, further comprising:

generating an image of the paper document, wherein the image of the paper document is unconsciously captured via the document reproduction system during the reproduction of the paper document without user intervention;

creating a second multimedia document by combining the image of the paper document and the multimedia annotation; and storing the second multimedia document in a storage that stores a plurality of multimedia documents, wherein the second multimedia document is an electronic document associated with the first multimedia document which is a physical document.

20. The machine-readable medium of claim 19, wherein the second multimedia document is represented as a second Uniform Resource Locator (URL) printed on the first multimedia document, and wherein the image of the paper document and the multimedia annotation is accessed with the second URL.

21. The machine-readable medium of claim 20, wherein the first multimedia document includes a third bar code that represents the second URL.

22. The machine-readable medium of claim 19, further comprising:

automatically emailing the second multimedia document to a recipient during the reproduction of the paper document, wherein the recipient is specified by a user via an interface of the document reproduction system when the user reproduces the paper document using the document reproduction system.

23. The machine-readable medium of claim 22, wherein the recipient receives the second multimedia document in the form of Multipurpose Internet Mail Extension (MIME).

24. A computer system, comprising:

a bus;

a data storage device coupled to the bus; and a processor coupled to the data storage device, the processor operable to receive instructions which, when executed by the processor, cause the processor to perform a method comprising:

reproducing a paper document via a document reproduction system;

creating a multimedia annotation for the paper document during the reproduction, wherein the multimedia annotation is an audio sound that is input by a user via a microphone of the document reproduction system;

creating a first multimedia document by combining the paper document and the multimedia annotation, wherein the first multimedia document includes a first bar code that encodes the audio sound therein;

processing the first multimedia document;

decoding the multimedia annotation from the first bar code;

extracting the audio sound; and playing the audio sound via a multimedia player.

25. The computer system of claim 24, wherein a location indicator associated with the multimedia annotation is placed on the first multimedia document, wherein the location indicator indicates where the multimedia annotation can be retrieved and played.

26. The computer system of claim 25, wherein the location indicator comprises a first Uniform Resource Locator (URL) indicated in plain text, wherein the first multimedia document includes a second bar code, and wherein the second bar code represents the first URL in an encrypted form.

27. The computer system of claim 24, wherein the method performed by the processor further comprises:
- generating an image of the paper document, wherein the image of the paper document is unconsciously captured via the document reproduction system during the reproduction of the paper document without user intervention;
- creating a second multimedia document by combining the image of the paper document and the multimedia annotation; and
- storing the second multimedia document in a storage that stores a plurality of multimedia documents, wherein the second multimedia document is an electronic document associated with the first multimedia document which is a physical document.

28. The computer system of claim 27, wherein the second multimedia document is represented as a second Uniform Resource Locator (URL) printed on the first multimedia document, and wherein the image of the paper document and the multimedia annotation is accessed with the second URL.

29. The computer system of claim 28, wherein the first multimedia document includes a third bar code that represents the second URL.

30. The computer system of claim 27, wherein the method performed by the processor further comprises:
- automatically emailing the second multimedia document to a recipient during the reproduction of the paper document, wherein the recipient is specified by a user via an interface of the document reproduction system when the user reproduces the paper document using the document reproduction system.

31. The computer system of claim 30, wherein the recipient receives the second multimedia document in the form of Multi-purpose Internet Mail Extension (MIME).

\* \* \* \* \*